(12) United States Patent
Toshiyoshi et al.

(10) Patent No.: US 11,722,074 B2
(45) Date of Patent: Aug. 8, 2023

(54) VIBRATION-DRIVEN ENERGY HARVESTING ELEMENT

(71) Applicants: The University of Tokyo, Tokyo (JP); Saginomiya Seisakusho, Inc., Tokyo (JP)

(72) Inventors: Hiroshi Toshiyoshi, Tokyo (JP); Hiroaki Honma, Tokyo (JP); Hiroyuki Mitsuya, Sayama (JP)

(73) Assignees: The University of Tokyo, Tokyo (JP); Saginomiya Seisakusho, Inc., Tokyo (JP)

( * ) Notice: Subject to any disclaimer, the term of this patent is extended or adjusted under 35 U.S.C. 154(b) by 77 days.

(21) Appl. No.: 17/289,115

(22) PCT Filed: Nov. 15, 2019

(86) PCT No.: PCT/JP2019/044860
§ 371 (c)(1),
(2) Date: Apr. 27, 2021

(87) PCT Pub. No.: WO2020/101014
PCT Pub. Date: May 22, 2020

(65) Prior Publication Data
US 2022/0014118 A1  Jan. 13, 2022

(30) Foreign Application Priority Data
Nov. 16, 2018 (JP) .................. 2018-215630

(51) Int. Cl.
*H02N 1/08* (2006.01)
(52) U.S. Cl.
CPC .................... *H02N 1/08* (2013.01)
(58) Field of Classification Search
CPC ........................................................ H02N 1/08
See application file for complete search history.

(56) References Cited

U.S. PATENT DOCUMENTS 9,263,192 B2* 2/2016 Hiroki ............. H01G 7/025
2005/0162811 A1* 7/2005 Obi ................. G02B 6/3584
361/437

(Continued)

FOREIGN PATENT DOCUMENTS

EP   2704170 A2 *  3/2014  ............ H01G 7/02
EP   3 550 714 A1   10/2019

(Continued)

OTHER PUBLICATIONS

"Deep Rie", Nanotech Japan Bulletin, Mar. 5, 2015 (retrieval date Jan. 16, 2020), pp. 1-6, vol. 8, No. 1, Internet (URL:https://www.nanonet.go.jp/magazine/content/files/mag_pdf/Staff_Aw_pdf/v8nl_BestResearchSupportAward2015.pdf, (six (6) pages).

(Continued)

*Primary Examiner* — Tulsidas C Patel
*Assistant Examiner* — Mohammed Ahmed Qureshi
(74) *Attorney, Agent, or Firm* — Crowell & Moring LLP

(57) ABSTRACT

A vibration-driven energy harvesting element includes: a pair of fixed electrode portions that have a plurality of fixed comb teeth and are arranged such that the plurality of fixed comb teeth face each other; and a movable electrode portion that is arranged between the pair of fixed electrode portions and has a pair of a plurality of movable comb teeth being inserted between the fixed comb teeth of the respective fixed electrode portions, wherein: the vibration-driven energy harvesting element has a three-terminal structure in which the fixed comb teeth and/or the movable comb teeth are electretized; a gap dimension of a clearance region between the fixed comb teeth and the movable comb teeth is smaller than 20 μm; and an aspect ratio being a ratio of a dimension of the clearance region in a comb tooth height direction to the gap dimension of the clearance region, is 20 or more.

3 Claims, 14 Drawing Sheets

(56) References Cited

U.S. PATENT DOCUMENTS

| | | | |
|---|---|---|---|
| 2006/0201249 A1 | | 9/2006 | Horning et al. |
| 2014/0065318 A1 | | 3/2014 | Suzuki et al. |
| 2016/0204716 A1 | | 7/2016 | Suzuki et al. |
| 2017/0318394 A1* | | 11/2017 | Hashiguchi ............ H04R 19/04 |

FOREIGN PATENT DOCUMENTS

| | | | | |
|---|---|---|---|---|
| JP | 2011-87384 A | | 4/2011 | |
| JP | 2013-13256 A | | 1/2013 | |
| JP | 5551914 B2 | | 7/2014 | |
| JP | 5627130 B2 | | 11/2014 | |
| JP | 2016-82836 A | | 5/2016 | |
| JP | 2016082836 A | * | 5/2016 | ........... C09K 3/1006 |
| JP | 2018-88780 A | | 6/2018 | |
| JP | 6927530 B2 | | 8/2021 | |
| WO | WO 2015/019919 A1 | | 2/2015 | |
| WO | WO 2017/057317 A1 | | 4/2017 | |

OTHER PUBLICATIONS

International Search Report (PCT/ISA/210) issued in PCT Application No. PCT/JP2019/044860 dated Jan. 28, 2020 with English translation (six (6) pages).

Japanese-language Written Opinion (PCT/ISA/237) issued in PCT Application No. PCT/JP2019/044860 dated Jan. 28, 2020 (four (4) pages).

Japanese-language Office Action issued in Japanese Application No. 2018-215630 dated Oct. 5, 2021 with English translation (six (6) pages).

Japanese Notice of Allowance issued in Japanese Application No. 2018-215630 dated Apr. 19, 2022 (one (1) page).

Extended European Search Report issued in European Application No. 19883692.6 dated Jun. 1, 2022, 2021 (seven (7) pages).

Mitsuya, H. et al., "A Broad-band Vibrational Energy Harvester Utilizing Symmetrical Comb-Drives Coupled with Strong Charged Electret", 2017 Symposium on Design, Test, Integration & Packaging of MEMS and MOEMS, XP033123854, pp. 1-4 (four (4) pages).

* cited by examiner

FIG. 10
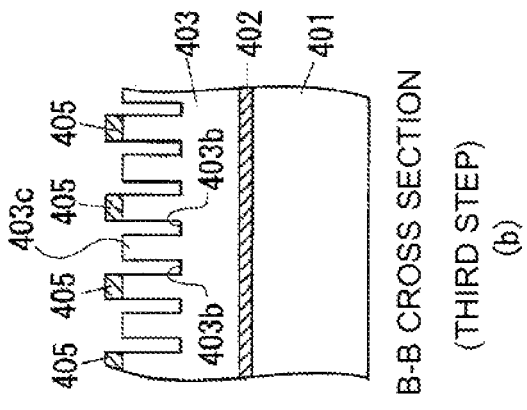
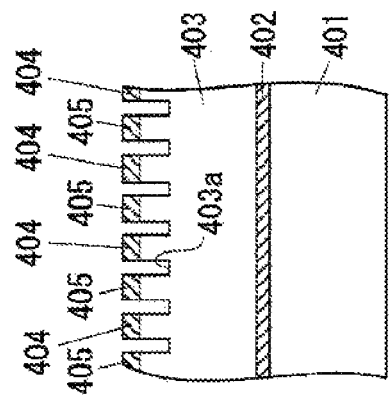
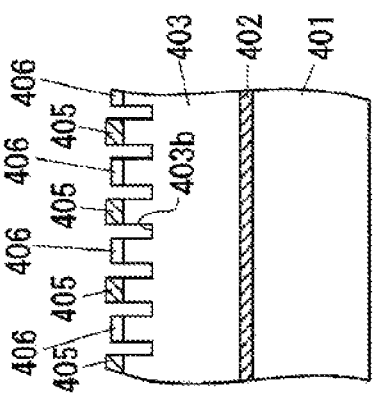

FIG. 13
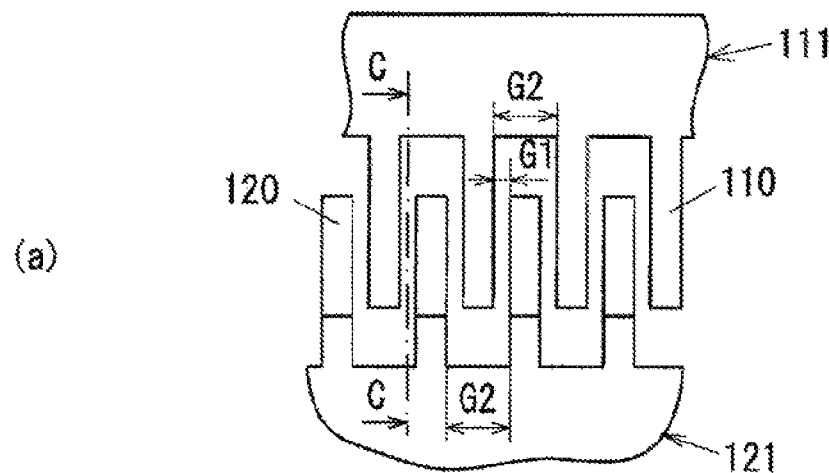
(a)
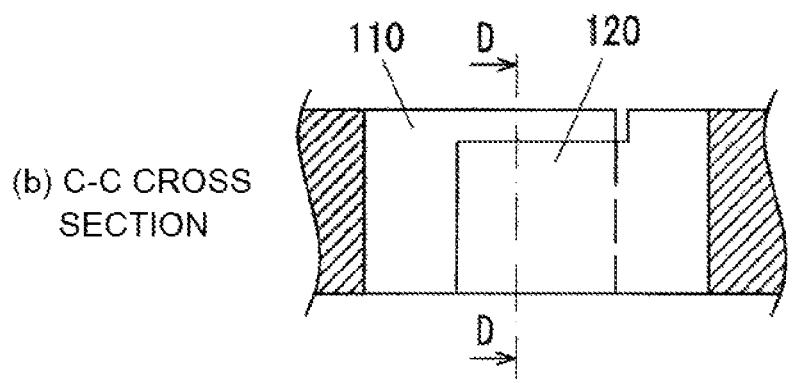
(b) C-C CROSS SECTION
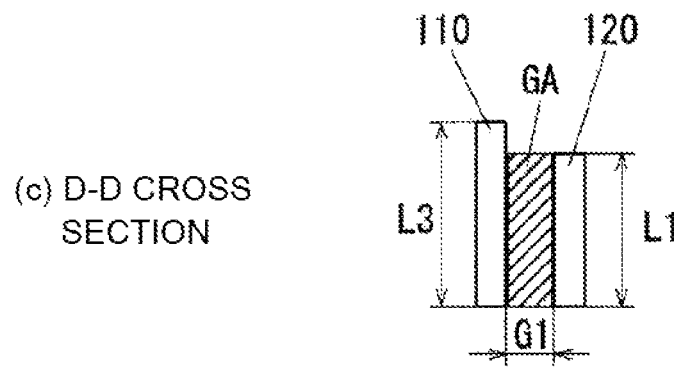
(c) D-D CROSS SECTION

VIBRATION-DRIVEN ENERGY HARVESTING ELEMENT

TECHNICAL FIELD

The present invention relates to a vibration-driven energy harvesting element.

BACKGROUND ART

Conventionally, an electrostatic type minute vibration-driven energy harvesting element using a MEMS processing technique is known. Patent Literature 1 (PTL 1) describes a vibration-driven energy harvesting element in which fixed side comb tooth electrodes and movable side comb tooth electrodes are arranged so as to interdigitate with each other, and power is generated as the insertion amount of the comb tooth electrodes changes due to vibration. The vibration-driven energy harvesting element described in PTL 1 has a three-terminal structure including a pair of fixed side electrodes and one movable side electrode that vibrates between the pair of fixed side electrodes, so that it is possible to generate power efficiently even if the external vibration is small.

CITATION LIST

Patent Literature

PTL 1: Japanese Laid-Open Patent Publication No. 2018-88780

SUMMARY OF INVENTION

Technical Problem

In the vibration-driven energy harvesting element described in PTL 1, in order to increase the generated power, it is generally necessary to increase the surface area of the comb tooth electrodes by increasing the number of comb tooth electrodes. In the electrostatic type minute vibration-driven energy harvesting element using the MEMS processing technique, an object is to obtain a larger generated power by utilizing the minute environmental vibration.

Solution to Problem

According to a 1st aspect of the present invention, a vibration-driven energy harvesting element, comprises: a pair of fixed electrode portions that have a plurality of fixed comb teeth and are arranged such that the plurality of fixed comb teeth face each other; and a movable electrode portion that is arranged between the pair of fixed electrode portions and has a pair of a plurality of movable comb teeth being inserted between the plurality of fixed comb teeth of the respective fixed electrode portions, wherein: the vibration-driven energy harvesting element has a three-terminal structure in which the fixed comb teeth and/or the movable comb teeth are electretized; a gap dimension of a clearance region between the fixed comb teeth and the movable comb teeth is smaller than 20 μm; and an aspect ratio, which is a ratio of a dimension of the clearance region in a comb tooth height direction to the gap dimension of the clearance region, is 20 or more.

According to a 2nd aspect of the present invention, in the vibration-driven energy harvesting element according to the 1st aspect, it is preferable that the fixed comb teeth and the movable comb teeth are formed of silicon; and a silicon oxide film containing a permanent charge is formed at a surface of at least either the fixed comb teeth or the movable comb teeth.

According to a 3rd aspect of the present invention, in the vibration-driven energy harvesting element according to the 2nd aspect, it is preferable that an electret protective film is formed on a surface of the silicon oxide film.

Advantageous Effects of Invention

According to the present invention, it is possible to increase the generated power while suppressing the increase in size of the vibration-driven energy harvesting element.

BRIEF DESCRIPTION OF DRAWINGS

FIG. 10 shows diagrams explaining a third step.

FIG. 13 shows diagrams illustrating an aspect ratio in a case where dimensions of a fixed side comb tooth electrode and a movable side comb tooth electrode are different from one another in the comb tooth height direction.

DESCRIPTION OF EMBODIMENTS

Figure 1:
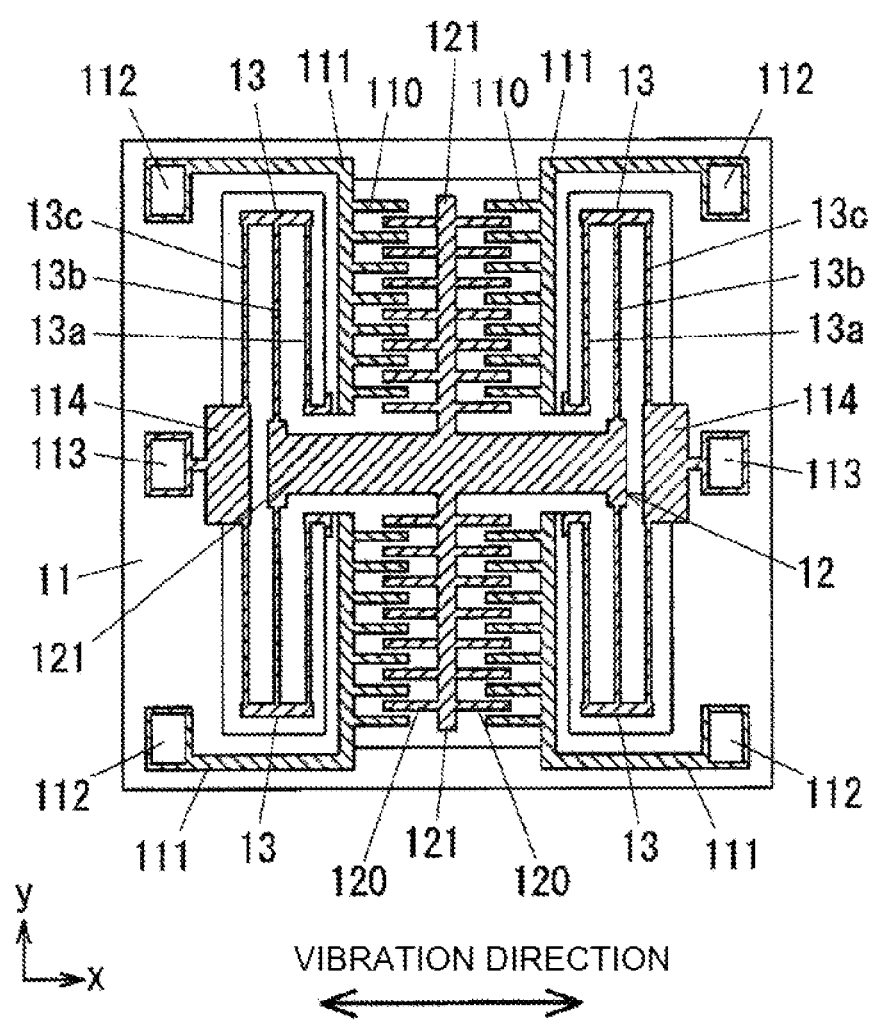
FIG. 1 is a plan view of a vibration-driven energy harvesting element.

Hereinafter, embodiments for carrying out the present invention will be described with reference to the drawings. FIG. 1 is a plan view of a vibration-driven energy harvesting element 1. The vibration-driven energy harvesting element 1 includes a fixed portion 11 provided with a fixed electrode portion 111, a movable portion 12 provided with a movable electrode portion 121, and an elastic support portion 13 elastically supporting the movable portion 12. The movable portion 12 is mechanically and electrically connected to a connecting portion 114 formed on the fixed portion 11 via the elastic support portion 13.

The vibration-driven energy harvesting element 1 shown in FIG. 1 is formed by a commonly used MEMS processing technique using an SOI (Silicon on Insulator) substrate. The SOI substrate is a substrate having a three-layer structure composed of a handle layer of Si, a BOX layer of $SiO_2$, and a device layer of Si. The fixed portion 11 is formed of the handle layer, and the fixed electrode portion 111, the movable portion 12, the elastic support portion 13, and the connecting portion 114 are formed of the device layer. It is to be noted, the vibration-driven energy harvesting element 1 is not limited to be formed by the SOI substrate and may be formed by using a Si substrate or the like.

Four sets of fixed electrode portions 111 are formed on the fixed portion 11, and a plurality of comb tooth electrodes 110, each extending in the x direction, are arranged in the y direction in each fixed electrode portion 111. In the movable portion 12, two sets of movable electrode portions 121 are formed at the upper side and the lower side of the drawing. A plurality of comb tooth electrodes 120, each extending in the x direction, are arranged in the y direction in each movable electrode portion 121. The comb tooth electrodes 110 of the fixed electrode portion 111 and the comb tooth electrodes 120 of the movable electrode portion 121 are arranged so as to interdigitate with each other with a predetermined interdigitating length in the x direction through a gap, in a stationary state.

The movable portion 12 is elastically supported by four sets of the elastic support portions 13. Each elastic support portion 13 includes three elastically-deformable beams 13a to 13c. An end of the beam 13a is fixed on the fixed portion 11, an end of the beam 13b is connected to either end of the movable electrode portion 12 in the x direction, and an end of the beam 13c is connected to the connecting portion 114 formed on the fixed portion 11. An electrode pad 112 is formed on the fixed electrode portion 111, and an electrode pad 113 is formed on the connecting portion 114. When the movable portion 12 vibrates in the x direction, the movable electrode portion 121 vibrates between the pair of fixed electrode portions 111, and thereby, the insertion amount (interdigitating amount) of the comb tooth electrode 120 with respect to the comb tooth electrode 110 of the fixed electrode portion 111 changes and power is generated.

Figure 2:
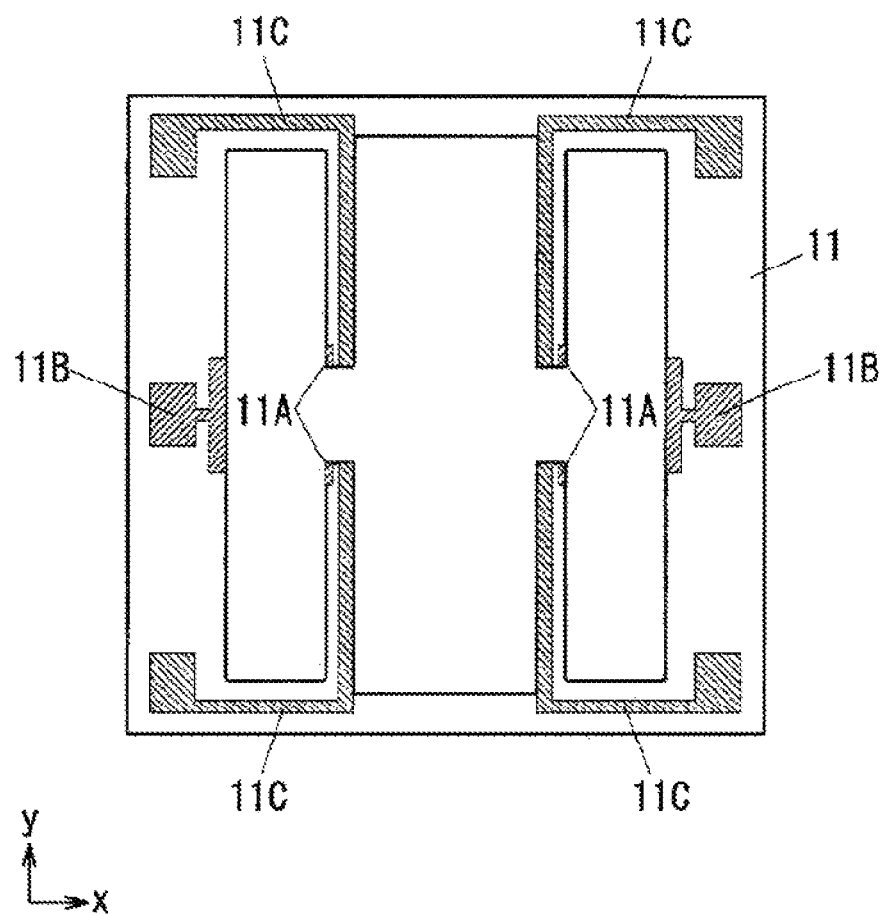
FIG. 2 is a diagram showing a shape of a fixed portion and a BOX layer ($SiO_2$ layer) on the fixed portion.

FIG. 2 shows, in a plan view, a shape of the fixed portion 11 formed in the handle layer of the SOI substrate and a shape of fixed portion regions 11A, 11B, 11C formed in the BOX layer and shown by hatching. The fixed portion regions 11A, 11B, and 11C are remaining parts of the BOX layer present between the fixed electrode portion 111, the connecting portion 114, and the elastic support portion 13 formed in the device layer and the fixed portion 11. The fixed portion region 11A is a BOX layer present between the end of the beam 13a and the fixed portion 11. The fixed portion region 11B is a BOX layer present between the connecting portion 114 and the fixed portion 11. The fixed portion region 11C is a BOX layer present between the fixed electrode portion 111 and the fixed portion 11.

Figure 3:
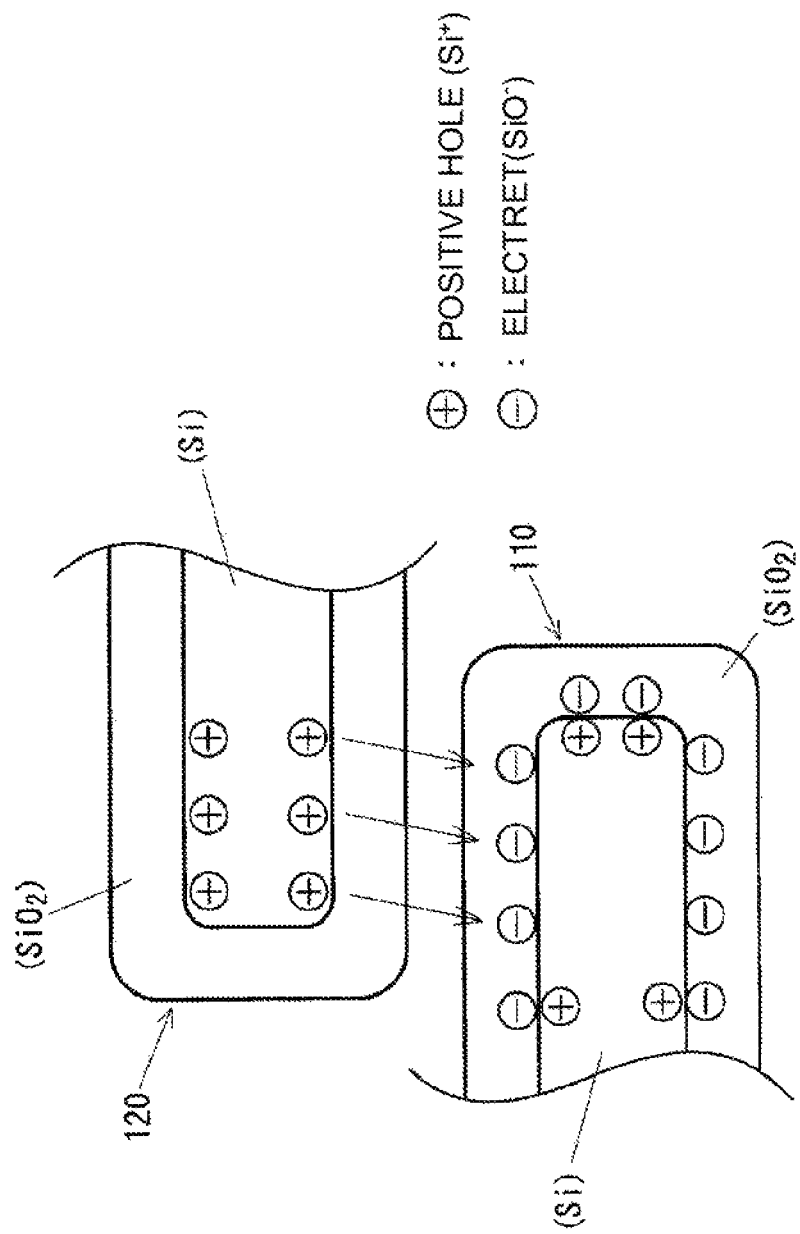
FIG. 3 is a diagram illustrating an electret formed at comb tooth electrodes.

FIG. 3 is a schematic view showing a partial cross section of the comb tooth electrode 110 of the fixed electrode portion 111 and the comb tooth electrode 120 of the movable electrode portion 121. An electret is formed at the comb tooth electrodes 110 and 120 by a well-known B-T method (Bias-Temperature method: see, for example, Japanese Laid-Open Patent Publication No. 2013-13256). In the example shown in FIG. 3, a negative charged (SiO$^-$) electret is formed in an oxide film (SiO$_2$ film) formed at the surface of the comb tooth electrode 110. Arrows indicate lines of electric force.

Figure 4:
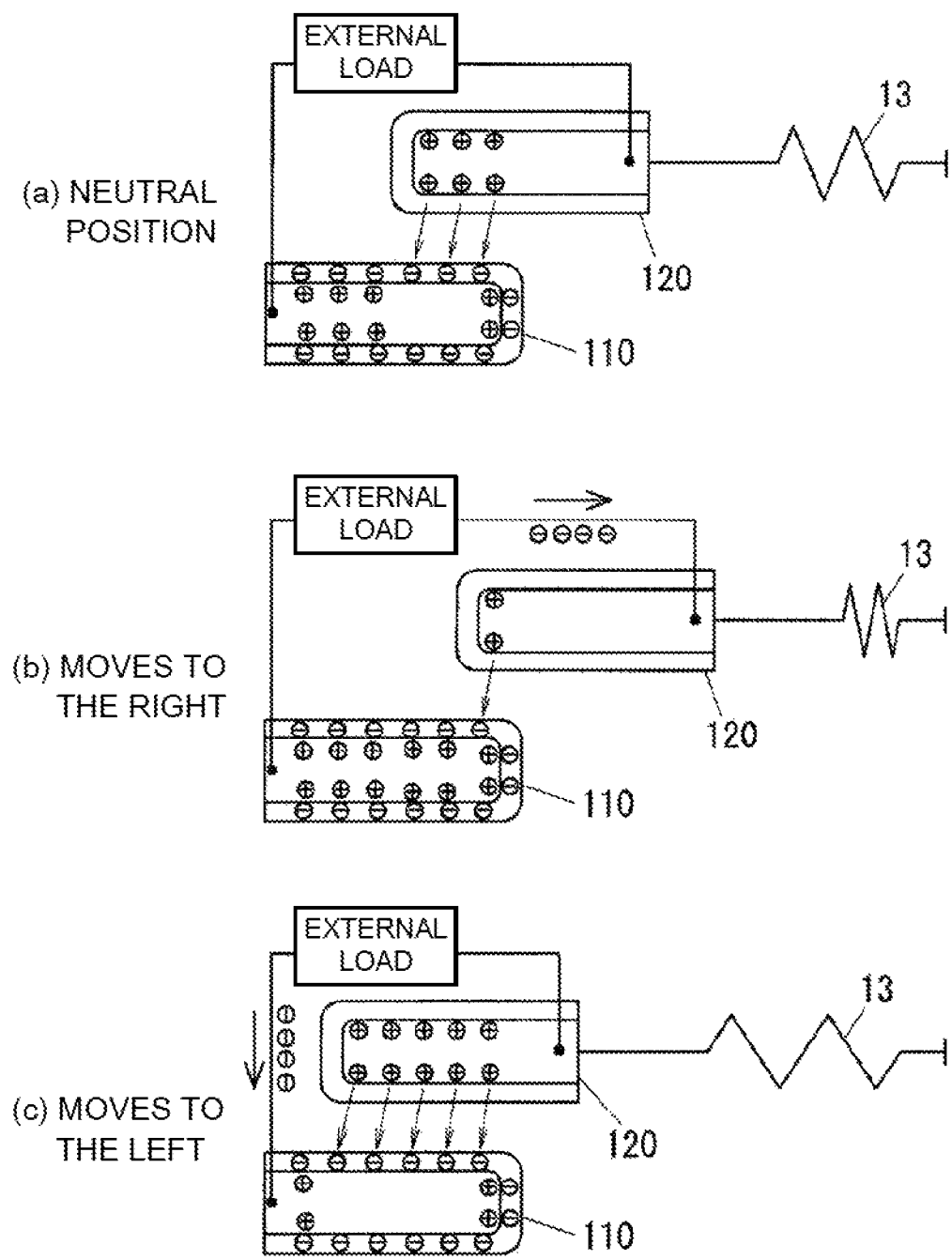
FIG. 4 shows diagrams explaining the principle of vibration-driven energy harvesting.

FIG. 4 shows diagrams explaining the principle of vibration-driven energy harvesting. It is to be noted that in FIG. 4, a two-terminal structure in which one movable electrode portion is provided for one fixed electrode portion is shown as an example. FIG. 4 (a) shows the comb tooth electrodes 110 and 120 in a case where the movable electrode portion 121 (not shown) is located at a neutral position where the electrostatic force of the electret and the elastic force of the elastic support portion 13 are balanced with each other. As the comb tooth electrode 120 on the movable electrode portion side moves to the right as shown in FIG. 4 (b) from the state of FIG. 4 (a) due to environmental vibration, the interdigitating region between the comb tooth electrode 110 and the comb tooth electrode 120 becomes smaller. As a result, electrostatically induced electrons flow from the comb tooth electrode 110 to the comb tooth electrode 120. On the contrary, as the comb tooth electrode 120 on the movable electrode portion side moves to the left as shown in FIG. 4 (c) from the state of FIG. 4 (a), the interdigitating region between the comb tooth electrode 110 and the comb tooth electrode 120 becomes larger. As a result, electrostatically induced electrons flow from the comb tooth electrode 120 to the comb tooth electrode 110.

In such a vibration-driven energy harvesting element that generates power by changing the insertion amount (interdigitating amount) of the comb tooth electrodes at which the electrets are formed, as the height of the facing surfaces (side walls) of the comb tooth electrodes 110 and 120 interdigitating with each other is larger, the larger amount of power is generated with the same vibration amount. That is, the thicker device layer of the SOI substrate at which the comb tooth electrodes 110 and 120 are formed allows the side wall areas of the comb tooth electrodes 110 and 120 to be larger. As a result, it is possible to provide a vibration-driven energy harvesting element which generates a larger amount of power even if the area of the element in the plan view in FIG. 1 remains the same.

In the vibration-driven energy harvesting element 1 at which the electret is formed, the comb tooth electrode 120 of the movable electrode portion 121 is drawn toward the comb tooth electrode 110 of the fixed electrode portion 111 due to the electrostatic attraction force by the electret. In a case where the elastic force due to the deformation of the elastic support portion 13 is relatively large, the electrostatic force and the elastic force stay in balance in a state that the comb tooth electrode 120 is drawn in halfway. In a case where the elastic force of the elastic support portion 13 is smaller than the electrostatic force, the electrostatic force and the elastic force are not balanced with each other, and the comb tooth electrode 120 is completely drawn in. Therefore, in a vibration-driven energy harvesting element having a two-terminal configuration as shown in FIG. 4, if the electrostatic force is increased due to the larger dimension (z direction dimension) of the comb tooth electrodes 110 and 120 in the thickness direction of the device layer, there arises a problem that the vibration does not readily occur with the small environmental vibration.

In the present embodiment, by adopting a three-terminal configuration in which the movable electrode portion 121 vibrates between the pair of fixed electrode portions 111, the vibration-driven energy harvesting element 1 is configured to have the three-terminal configuration in which the electrostatic attraction generated by one of the comb tooth electrodes 110 and 120 cancels the electrostatic attraction generated by the other of the comb tooth electrodes 110 and 120. Furthermore, by adopting the three-terminal configuration, it is possible to increase the size of the comb tooth electrodes 110 and 120 in the comb tooth height direction, that is, the dimension in the z direction without taking account of an influence of the electrostatic attraction, and therefore, increase in the amount of power generation is facilitated without increasing the number of comb teeth. The amount of power generation can also be increased by increasing the number of comb teeth while sustaining the z-direction dimension of the comb tooth electrodes as it is, however in such a case, there is a drawback that the plan view area of the vibration-driven energy harvesting element 1 increases, causing the vibration-driven energy harvesting element 1 to become bulky.

Figure 5:
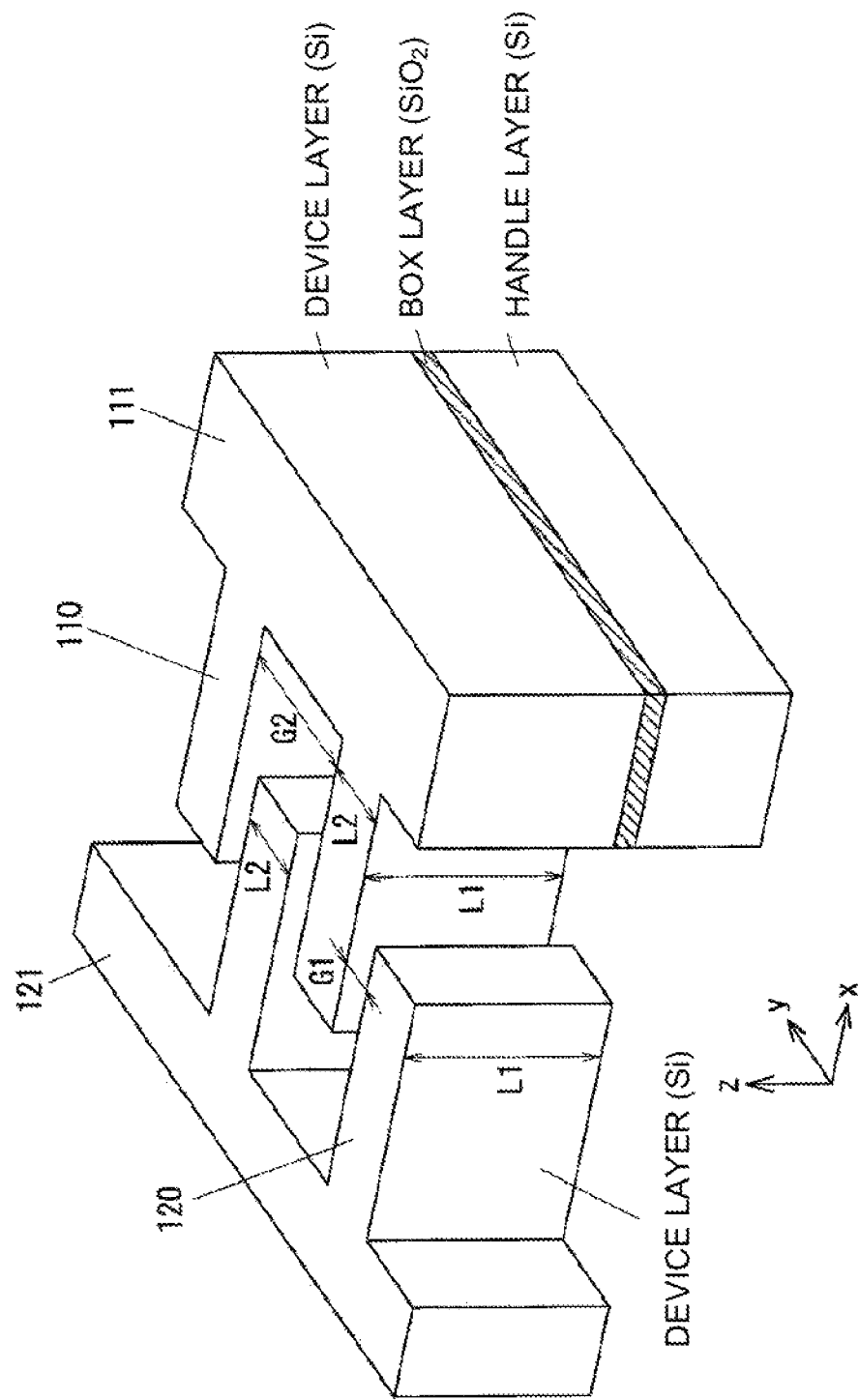
FIG. 5 is an enlarged view of a portion of the comb tooth electrodes that interdigitate with each other.

In the vibration-driven energy harvesting element 1 provided with the comb tooth electrodes 110 and 120 that interdigitate with each other, the gap size of the portion where the comb tooth electrode 120 is inserted between the comb tooth electrodes 110, that is, the gap dimension G1 between the comb tooth electrodes 110 and 120 in an interdigitated state as shown in FIG. 5, is smaller than the gap size G2 of a non-interdigitated portion between the adjacent comb tooth electrodes 110. The z-direction dimension L1 of the comb tooth electrodes 110 and 120 is generally the same as the thickness dimension of the device layer of the SOI substrate. L2 is the y-direction dimension of the comb tooth electrodes 110 and 120.

Regarding a clearance region (hereinafter, also referred to as a gap region) between the comb tooth electrodes 110 and 120, the ratio L1/G1 of the dimension L1 of the gap region in the comb tooth height direction to the gap dimension G1 of the gap region is referred to as an aspect ratio. Similarly, in the comb tooth electrodes 110 near the roots of the comb teeth, the aspect ratio of the gap region between the adjacent comb tooth electrodes 110 at a non-interdigitated portion is represented by L1/G2. As an example, in the case of G1=9 µm, L1=300 µm, and L2=20 µm, then G2=38 µm, and in such a case the aspect ratio of the gap region between the comb tooth electrodes 110 and 120 is 33.3 and the aspect ratio of the gap region between the adjacent comb tooth electrodes 110 is 7.9.

It is to be noted, as shown in FIG. 13, in a case where the dimension L3 of the fixed side comb tooth electrode 110 in the comb tooth height direction is different from the dimension L1 of the movable side comb tooth electrode 120 as L1<L3, a clearance region GA is a region sandwiched between the comb tooth electrode 110 and the comb tooth electrode 120, and the dimension of the clearance region GA in the comb tooth height direction is L1. With respect to FIG. 13, (a) is a plan view of the comb tooth electrodes 110 and 120, (b) is a C-C cross sectional view, and (c) is a D-D cross sectional view. The aspect ratio of the clearance region GA is represented as L1/G1. On the other hand, in a case where L3<L1, the dimension of the clearance region GA in the comb tooth height direction is L3, and the aspect ratio is expressed as L3/G1.

In the vibration-driven energy harvesting element 1 of the present embodiment, the comb tooth electrode 110 of the fixed electrode portion 111 and the comb tooth electrode 120 of the movable electrode portion 121 are interdigitated with each other and vibration occurs in the insertion direction. In such a structure, the gap dimension G1 of the portion in the interdigitated state differs from the gap dimension G2 of the portion in the non-interdigitated state. The vibration-driven energy harvesting element 1 is formed by processing an SOI substrate by semiconductor processing technology, and grooves having a large aspect ratio such as the gap regions of the comb tooth electrodes 110 and 120 are usually processed by Deep-RIE.

Figure 6:
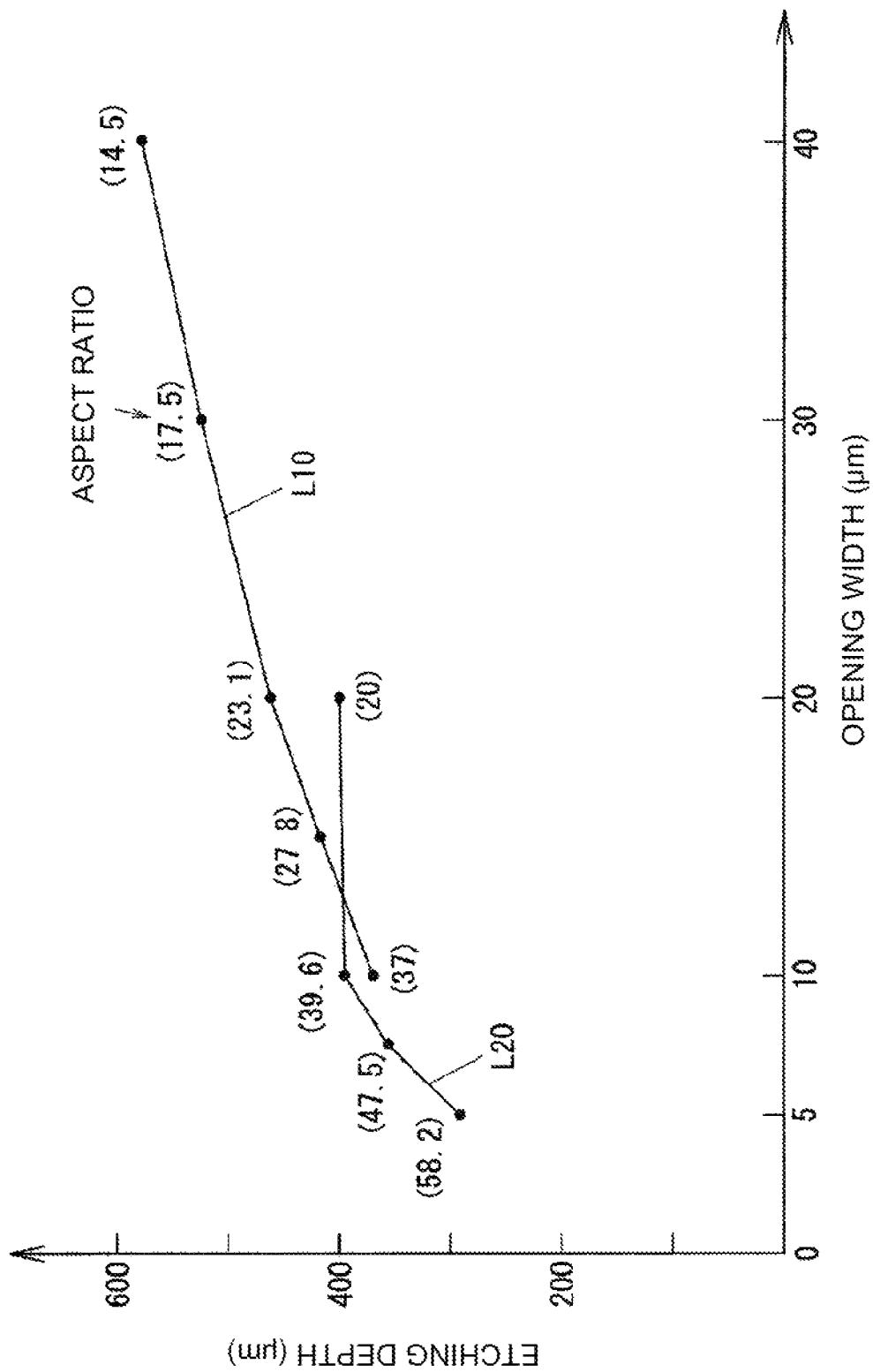
FIG. 6 is a graph showing an example of measured values of an etching rate.

The etching rate in the Deep-RIE depends on the gap dimension (groove width). FIG. 6 is a graph showing an example of measured values of an etching rate. The line L10 shows etching depth for the grooves having opening widths from 10 µm to 30 µm when the etching depth of the groove having an opening width of 40 µm reaches 578.6 µm after simultaneously starting etching of the grooves having the opening widths of 10 µm, 15 µm, 20 µm, 30 µm, and 40 µm. Further, the line L20 shows etching depth for the grooves having opening widths from 5 µm to 10 µm when the etching depth of the groove having an opening width of 20 µm reaches 400 µm after simultaneously starting etching of the grooves having opening widths of 5 µm, 7.5 µm, 10 µm, and 20 µm.

The aspect ratios for the opening widths of 10 µm, 15 µm, 20 µm, 30 µm, and 40 µm on the line L10 are 37, 27.8, 23.1, 17.5, and 14.5, respectively. Further, the aspect ratios for the opening widths of 5 µm, 7.5 µm, 10 µm, and 20 µm on the line L20 are 58.2, 47.5, 39.6, and 20, respectively.

Comparing the lines L10 and L20, a degree of change of the etching rate with respect to the opening width changes around the opening width of approximately 10 to 20 µm. That is, it is presumed that a degree of decrease in the etching rate gradually increases from around the opening width of 20 µm, and further, as the opening width becomes smaller than approximately 10 µm and the aspect ratio becomes larger than 30, a degree of decrease in the etching rate becomes more remarkable. It has been found that in a case where gap regions having different aspect ratios coexist as shown in FIG. 5, the etching rates in the gap regions having different aspect ratios differ greatly from one another, which adversely affects the shape of the comb teeth formed by the etching process.

For example, a ratio of the etching rate for the opening width of 5 µm to the etching rate for the opening width of 20 µm is smaller than a ratio of the etching rate for the opening width of 20 µm and the etching rate for the opening width of 40 µm. Therefore, for etching the device layer of the SOI substrate up to the BOX layer, the time difference between the etching times required to etch the opening width of 5 µm and the opening width of 20 µm until the BOX layer, is greater than the time difference between the etching times required to etch the opening width of 20 µm and the opening width of 40 µm until the BOX layer. If the etching time difference is large, a groove side wall near the BOX layer is further etched in an etching groove having a larger opening width that has reached the BOX layer earlier. As a result, the wall thickness, that is, the width dimension of the comb tooth electrode becomes smaller, and it adversely affects vibration-driven energy harvesting. Such an influence on the thickness of the groove side wall becomes more remarkable as the distance up to the BOX layer becomes larger, and in a case where the aspect ratio of the gap region of the gap dimension G1 is 20 or more, it may affect the vibration-driven energy harvesting.

Figure 7:
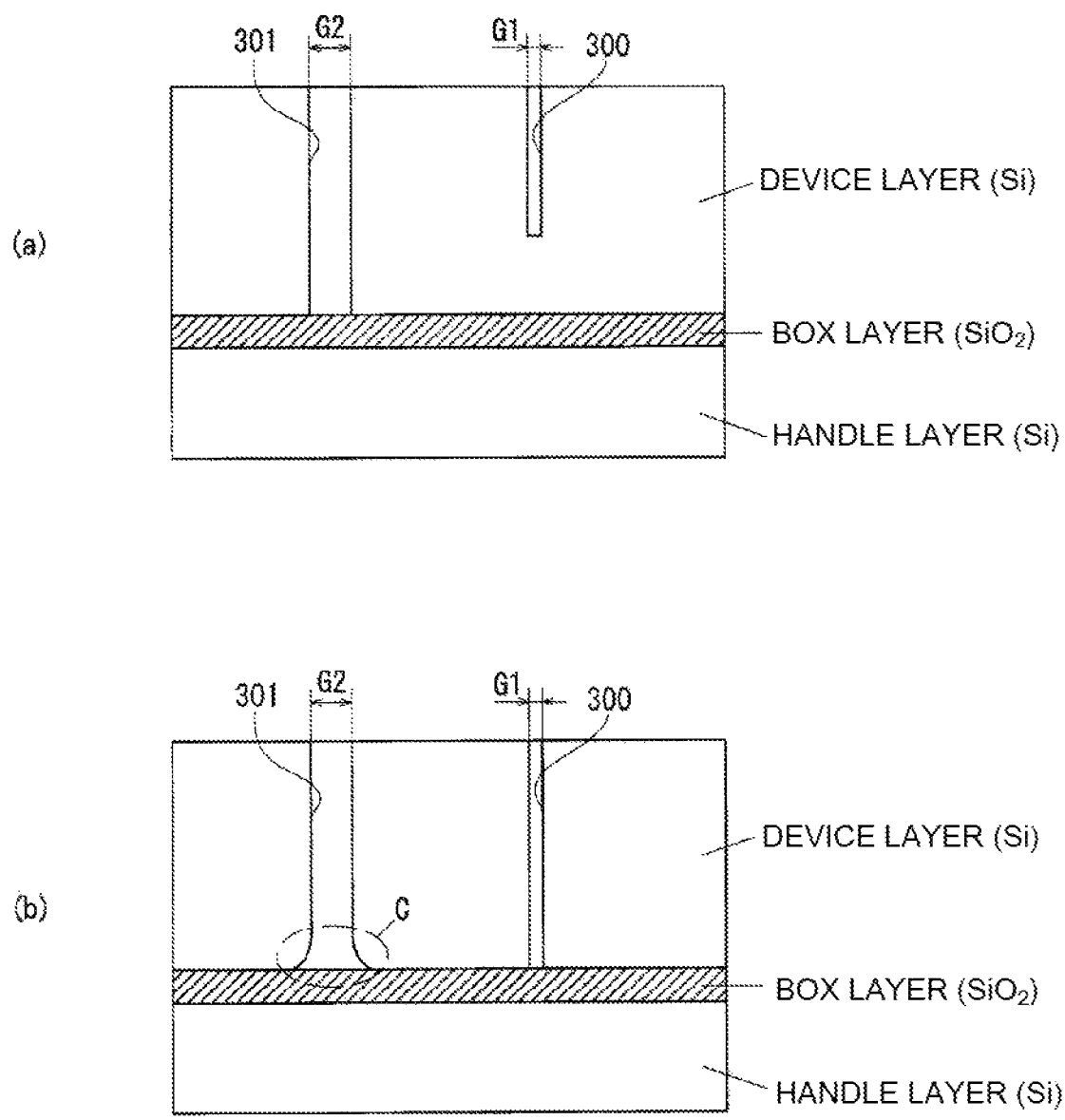
FIG. 7 shows diagrams schematically showing a shape of etching grooves.

FIG. 7 shows diagrams schematically showing etching groove shapes when forming a groove 300 having a gap dimension G1 and a groove 301 having a gap dimension G2 (>G1) in the device layer of the SOI substrate. FIG. 7 (a) shows the shape of the groove 301 having the gap dimension G2 upon reaching the BOX layer and the shape of the groove 300 having a narrower groove width which has not yet reached the BOX layer. FIG. 7 (b) shows the shape of the groove 300 upon reaching the BOX layer. From the state of FIG. 7 (a) to the state of FIG. 7 (b), the device layer tends to be etched in the lateral direction near the bottom of the groove 301 (near the BOX layer). When the groove 300 has reached the BOX layer as shown in FIG. 7 (b), the groove 301 has a shape in which the groove wall portion is etched to be a notch shape in a region C near the BOX layer.

Comb Tooth Electrode Forming Method

Figure 8:
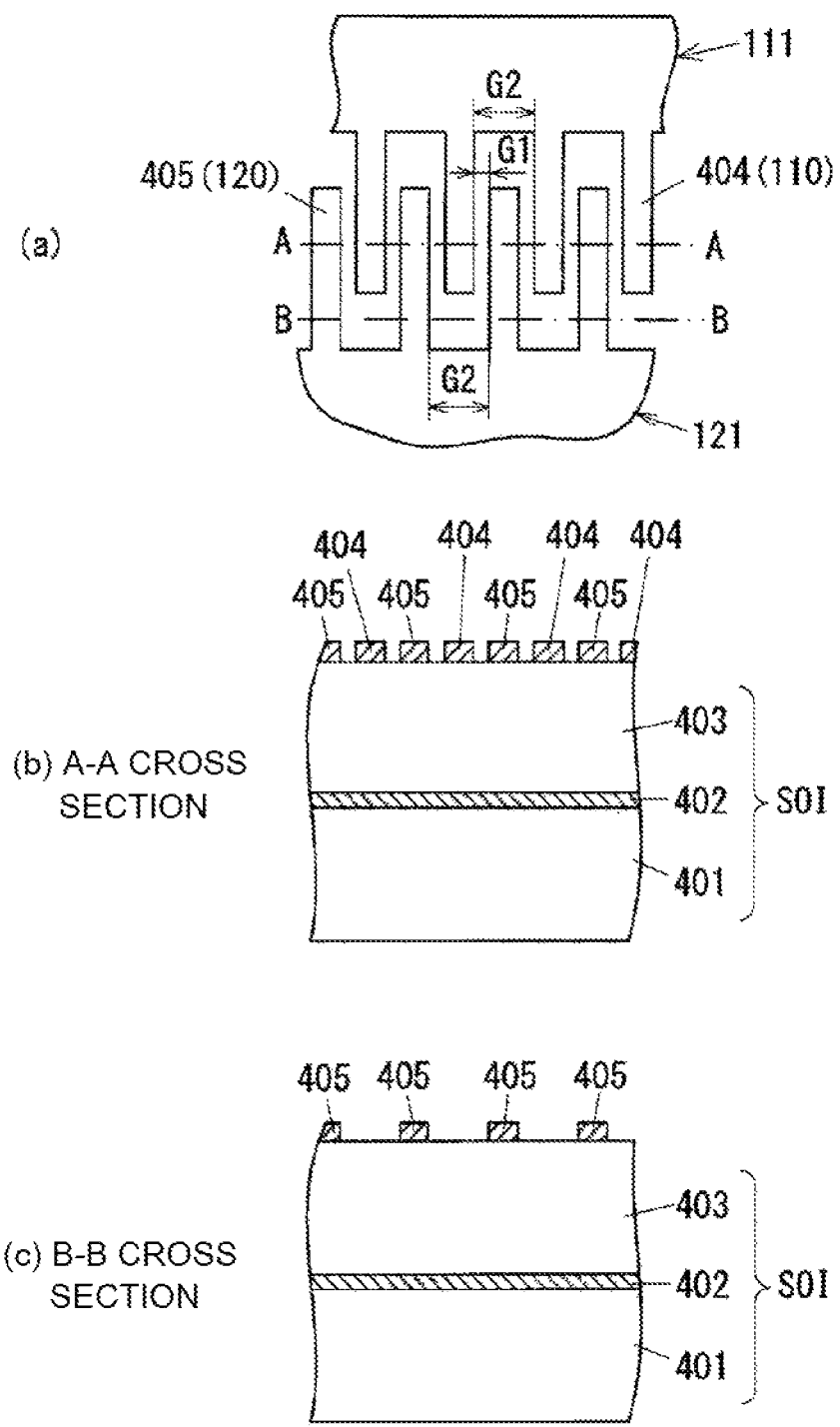
FIG. 8 shows diagrams showing a procedure for forming the comb tooth electrode portion.

In the present embodiment, in order to prevent from etching into a notch shape as shown in FIG. 7 (b), a mask form for forming the comb tooth electrodes different from the conventional one is employed. Because the method of forming the structure body of the vibration-driven energy harvesting element 1 using the SOI substrate is the same as the conventional forming method (for example, refer to WO2015/019919 and the like) except for the mask form of the comb tooth electrode portion, only the procedure for forming the comb tooth electrodes 110 and 120 in the structure body will be described hereinafter. FIGS. 8 to 11 are diagrams showing a procedure for forming the comb tooth electrodes 110 and 120. FIG. 8 (*a*) is a plan view of portions of the comb tooth electrodes 110 and 120, and FIGS. 8 (*b*) and 8 (*c*) show an A-A cross-sectional view and a B-B cross-sectional view, respectively.

In a first step, an SOI substrate composed of a handle layer 401, a BOX layer 402, and a device layer 403 is prepared, and patterned aluminum masks 404 and 405 for forming the comb tooth electrodes 110 and 120 are formed on the surface of the device layer 403 in shapes as shown in FIGS. 8(*a*) to 8(*c*). The plan view shape of the patterned aluminum masks 404 corresponds to the plan view shape of the comb tooth electrodes 110, and the plan view shape of the patterned aluminum masks 405 corresponds to the plan view shape of the comb tooth electrodes 120. The A-A cross sectional view (FIG. 8 (*b*)) shows that, in the interdigitated state region, the patterned aluminum masks 404 and 405 are formed, and the B-B cross sectional view (FIG. 8 (*c*)) shows that, in a non-interdigitated root region of the comb tooth electrodes 120, only the patterned aluminum masks 405 are formed. The distance (opening width) G2 between the patterned aluminum masks 405 shown in FIG. 8 (*c*) is wider than the distance (opening width) G1 between the patterned aluminum mask 404 and the patterned aluminum mask 405 shown in FIG. 8 (*b*). As shown in FIG. 8 (*a*), the distance between the patterned aluminum masks 404 is also G2.

Figure 9:
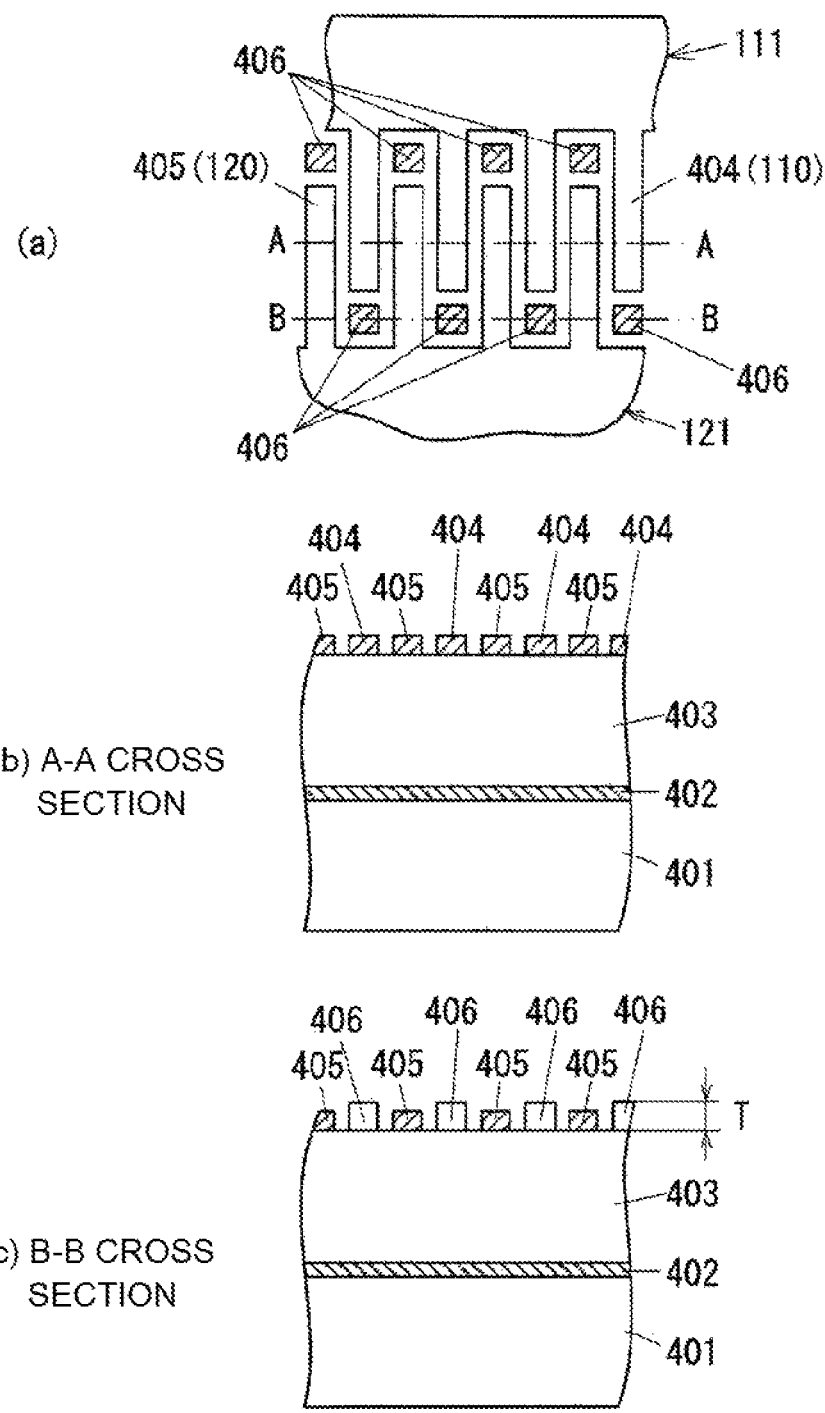
FIG. 9 shows diagrams showing a procedure subsequent to the procedure shown in FIG. 8.

FIG. 9 shows diagrams showing a second step. In the second step, as shown in a plan view of FIG. 9 (*a*), a patterned dummy 406 of a resist is formed, in each space between the adjacent patterned aluminum masks 405 and between the adjacent patterned aluminum masks 404, at the comb teeth root region. The patterned dummies 406 are arranged in a pattern for adjusting the etching completion timings (timings to reach the BOX layer) of a groove having a narrower opening width and a groove having a wider opening width to be almost the same as one another, and at the end of the groove processing (at the completion of forming of the comb tooth electrodes) by the Deep-ME, the pattered dummies 406 are removed by etching. The method of setting the thickness T of the patterned dummies 406 will be described later.

While a resist is used here as a material of the patterned dummies 406, any materials other than the resist can also be used as long as its etching rate by the Deep-RIE is larger than that of the patterned aluminum masks and it can be removed at the end of the etching process. Here, as shown in FIG. 9 (*a*), a case where a distance between the patterned dummy 406 and the patterned aluminum mask 404, 405 is set to be substantially equal to a distance between the adjacent aluminum mask patterns 404, 405 in an interdigitated state will be described.

Figure 11:
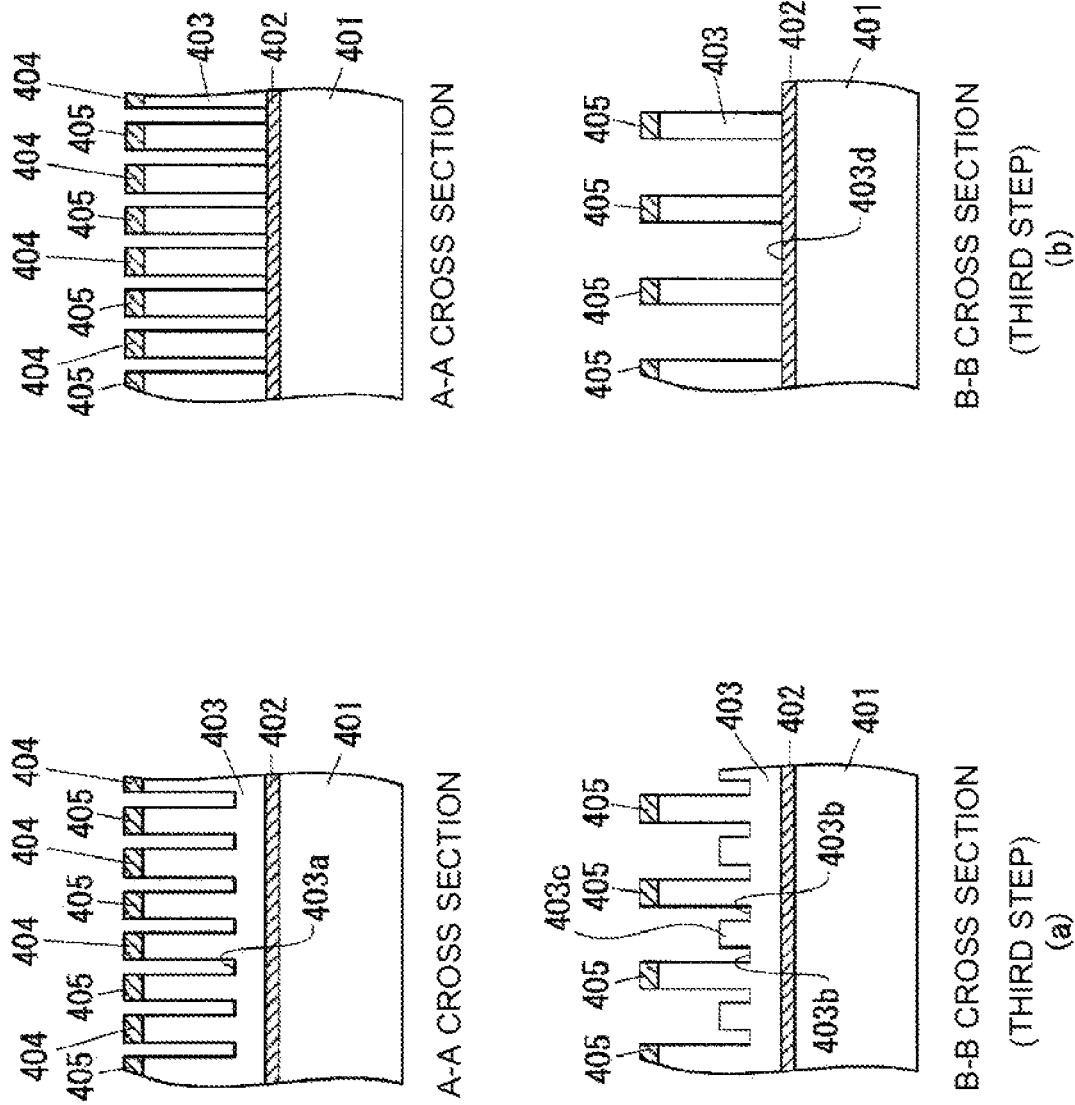
FIG. 11 shows diagrams explaining the third step subsequent to the procedure shown in FIG. 10.

FIGS. 10 and 11 are diagrams showing a third step. In the third step, etching by the Deep-RIE is performed to form the comb tooth electrodes 110 and 120 at the device layer 403. The etching proceeds in the order of FIG. 10 (*a*), FIG. 10 (*b*), FIG. 11 (*a*), and FIG. 11 (*b*), and at the state shown in FIG. 11 (*b*), the etching step (the third step) is completed. The A-A cross-sectional view of FIG. 10 (*a*) shows that exposed portions of the device layer 403 without being covered with the patterned aluminum masks 404 and 405 are etched to be dug down, and grooves 403*a* are being formed. On the other hand, the B-B cross sectional view shows that exposed portions of the device layer 403 between the patterned dummies 406 and the patterned aluminum masks 405 are etched to form grooves 403*b*, and the patterned dummies 406 of the resist are also etched and the thickness thereof decreases.

FIG. 10 (*b*) shows a state at which the etching time has further elapsed from FIG. 10 (*a*) and the thickness of the patterned dummies 406 has become zero by etching as shown in a B-B cross sectional view. The depths of the grooves 403*a* and 403*b* are increased as compared with the state shown in FIG. 10 (*a*). As shown in the B-B cross sectional view, the device layer 403 exposed between the adjacent patterned aluminum masks 405 has a cross-sectional shape in which the grooves 403*b* are formed on both sides of a convex portion 403*c*.

FIG. 11 (*a*) shows a state at which the etching time has further elapsed from FIG. 10 (*b*). The depths of the grooves 403*a* and 403*b* are further increased, and as shown in a B-B cross sectional view, the convex portions 403*c* are also etched so that a tip position thereof becomes lower than in the state of FIG. 10 (*b*). In the B-B cross sectional view, as the distance between the adjacent patterned aluminum masks 405 (that is, the opening width) is wider than the distance between the patterned aluminum mask 404 and 405 in a A-A cross sectional view, its etching rate is greater. Therefore, a rate of lowering the tip position of the convex portions 403*c* is greater than a rate of increase in the depth of the grooves 403*a*.

FIG. 11 (*b*) shows a state when the grooves 403*a* in a A-A cross sectional view have reached the BOX layer 402 after further elapsing the etching time from FIG. 11 (*a*). The grooves 403*b* shown in FIG. 11 (*a*) have reached the BOX layer 402 almost at the same time as the grooves 403*a* in the A-A cross sectional view, as shown in a B-B cross sectional view in FIG. 11 (*b*). Further, the convex portions 403*c* shown in FIG. 11 (*a*) are also completely removed by etching almost at the same time when the grooves 403*a* have reached the BOX layer 402. As a result, a groove 403*d* having a wider groove width is formed between the adjacent patterned aluminum masks 405.

After that, the structure body of the vibration-driven energy harvesting element 1 is formed through a step of releasing from the BOX layer by BHF (buffered hydrofluoric acid) or the like. As described above, while the patterned dummies 406 are removed by the Deep-RIE as described above, a protective film for the Deep-RIE may remain around the patterned dummies 406. However, the protective film is also released and removed in the releasing process from the BOX layer.

After forming the structure body of the vibration-driven energy harvesting element 1, electret films are formed at the comb tooth electrodes 110 and 120 by a well-known B-T method. Further, in order to improve the stability (moisture resistance) of the electret, a protective film may be formed on surfaces of the electret films. Among various types of protective films, for example, an aluminum oxide film formed by a well-known Atomic Layer Deposition (ALD) method is preferable. Although the explanation of the method for forming the aluminum oxide film by the ALD method is omitted herein, it can be formed by a well-known manufacturing method such as that described in Japanese Laid-Open Patent Publication No. 2016-82836. By using the ALD method, it is possible to achieve a uniform film forming property even on a surface of a structure body having a large aspect ratio such as in the gap region of the comb tooth electrodes according to the present embodiment, and to improve the charge stability of the electret.

The thickness of the patterned dummy 406 may be set as follows, for example. First, patterned aluminum masks having an opening of a gap dimension G1 and an opening having a gap dimension G2 (>G1) are formed on a Si substrate that is equivalent to the device layer 403. Next, by performing etching by the Deep-ME, a time t2 (min) until an etching groove depth of the opening having the gap dimension G2 reaches a desired depth H is measured. By further performing etching, a time t1 (min) until an etching groove depth of the opening having the gap dimension G1 reaches the desired depth H is measured. Next, an etching rate (etching speed) Rer (μm/min) of the resist used for the patterned dummy 406 is determined. It is to be noted, a width (gap dimension) of the opening for etching the resist is set to be the gap dimension G2. As shown in FIG. 5, in a case where the comb tooth height (dimension in the z direction), that is, the thickness of the device layer 403 is L1, the thickness T required for the patterned dummy 406 is calculated as $T=-t2 \cdot Rer \cdot (L1/H)$.

Further, with the desired depth being H (μm), the etching rate Re1 when etching the Si substrate through the opening of the gap dimension G1 is expressed as $Re1=H/t1$, and the etching rate Re2 when etching the Si substrate through the opening of the gap dimension G2 is expressed as $Re2=H/t2$. Therefore, by using the etching rates Re1 and Re2, the thickness T required for the patterned dummy 406 is calculated as $T=(1/Re1-1/Re2) \times Rer \times L1$.

As described above, in the present embodiment, in a case where openings having different gap dimensions are present as shown in FIG. 8, the patterned dummies 406 are arranged in the openings having a larger gap dimension as shown in FIG. 9 (a). Thereby, the etching can reach the BOX layer 402, which is the etching stop layer, at substantially the same timing in a portion where the gap dimension G1 is small and the aspect ratio is large as in the region where the comb tooth electrodes 110 and 120 are interdigitated with each other, and in a portion where the gap dimension G2 is large and the aspect ratio is small as in the root region of the comb tooth electrodes 110 and 120, as shown in FIG. 11 (b). As a result, it is possible to prevent the groove wall portion from being etched in a notch shape, as shown by the sign C in FIG. 7 (b), in the root region (gap dimension G2) of the comb tooth electrodes 110 and 120, and thereby it is possible to form a comb tooth electrode having a desired shape.

Variation of Patterned Dummy 406

Figure 12:
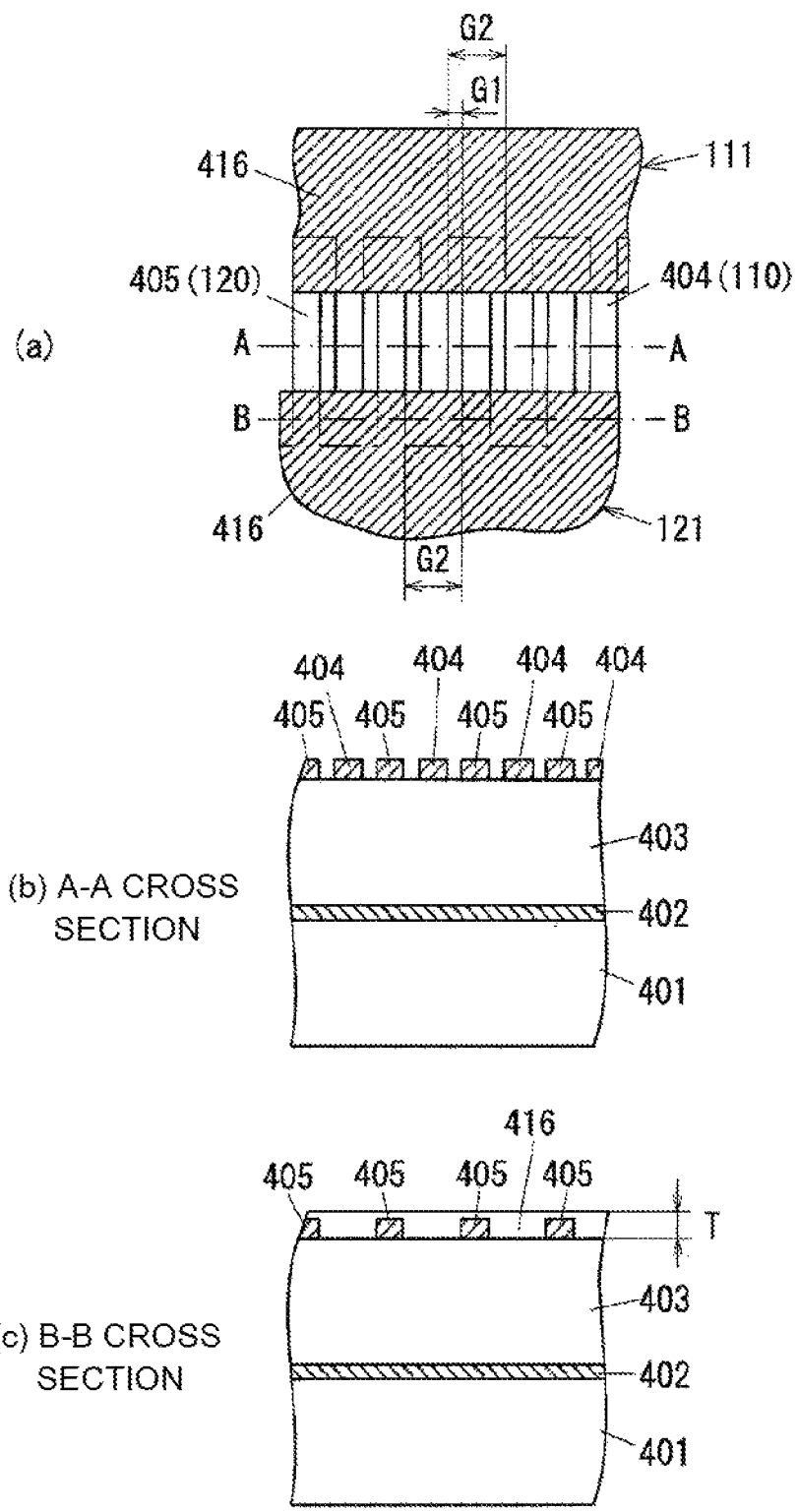
FIG. 12 shows diagrams illustrating a variation of a dummy pattern, in which a second step is shown.

In the example shown in FIG. 9 (a) described above, the patterned dummies 406 are arranged at intervals between the adjacent patterned aluminum masks 405, however an arrangement example of the patterned dummies 406 is not limited to this. For example, instead of the patterned dummies 406 described above, a dummy mask 416 may be formed as shown in FIG. 12. In FIG. 12 also, similarly to FIG. 9, (a) is a plan view, (b) is an A-A cross sectional view, and (c) is a B-B cross sectional view.

The dummy mask 416 is not formed in the comb tooth region having the gap dimension of G1 so that the A-A cross sectional view in FIG. 12 (b) is the same as that in FIG. 9 (b). On the other hand, in the comb tooth portion having the gap dimension G2, the dummy mask 416 of a resist is formed so as to cover not only the openings but also the patterned aluminum masks 404 and 405. As shown in the B-B cross sectional view in FIG. 12 (c), the dummy mask 416 is formed so that its thickness T at the opening portion is the same as the thickness T of the patterned dummy 406 shown in FIG. 9 (c).

Even in a case where such a dummy mask 416 is formed, the etching of the gap region having the gap dimension G1 and the etching of the gap region having the gap dimension G2 can reach the BOX layer 402 at substantially the same timing. However, in the case of this variation, an unnecessary protective film may remain at the comb teeth portion as a residue having a shape like a protrusion even after the Deep-RIE is performed, causing the movable side comb tooth electrode 120 to be locked to the fixed side comb tooth electrode 110. Furthermore, if an attempt is made to remove the protective film remaining after etching with BHF in the above releasing process, there is a risk that the shape of the comb tooth portion may be deformed or the comb tooth portion may be removed by the release process due to excessive etching.

As described above, in the present embodiment and the variation, by arranging the patterned dummies 406 or the dummy mask 416 in the opening region having a wider opening width of the gap dimension G2, the etching completion timings for the gap dimension G2 and the smaller gap dimension G1 can be substantially the same as each other. As a result, in the vibration-driven energy harvesting element having a structure in which the fixed side and movable side comb tooth electrodes interdigitate with each other, a comb teeth structure having a large aspect ratio in the gap region can be formed in an accurate shape. Although a cleaning step or an $O_2$ ashing step for removing the protective film after the Deep-RIE is additionally practically required, side walls that face each other in the side walls of the pair of comb tooth electrodes 110 of the fixed electrode portion 111, can be formed as vertical walls from the BOX layer to the surface of the handle layer. The same applies to the pair of comb tooth electrodes 120 of the movable electrode portion 121, and the side walls facing each other can be formed as vertical walls from the BOX layer to the surface of the handle layer. Therefore, it is possible to obtain the power generation output as designed, and it is possible to take out a larger amount of power even under vibration conditions with small acceleration from the outside.

As an example, in vibration-driven energy harvesting elements having the same comb teeth structure, the generated powers are compared with each other for the aspect ratio in the gap region having the gap dimension G1 shown in FIG. 5 being 7.1 and for the aspect ratio being 33.1. In the case of the vibration-driven energy harvesting element with the aspect ratio of 7.1, the comb tooth electrodes have G1=14 μm and L1=100 μm, and under a condition that the load resistance is 7 MΩ (optimal load connection), the resonance frequency is 125 Hz and the acceleration is 0.05 the generated power thus obtained is 68 μW. In the case of the vibration-driven energy harvesting element with the aspect ratio of 33.1, the comb tooth electrodes have G1=9 μm and L1=300 μm, and under a condition that the load resistance is 5 MΩ (optimal load connection), the resonance frequency is 139 Hz, and the acceleration is 0.20 G, the generated power thus obtained is 435 μW. That is, by setting the larger aspect ratio, the generated power can be increased by 6.4 times.

Figure 14:
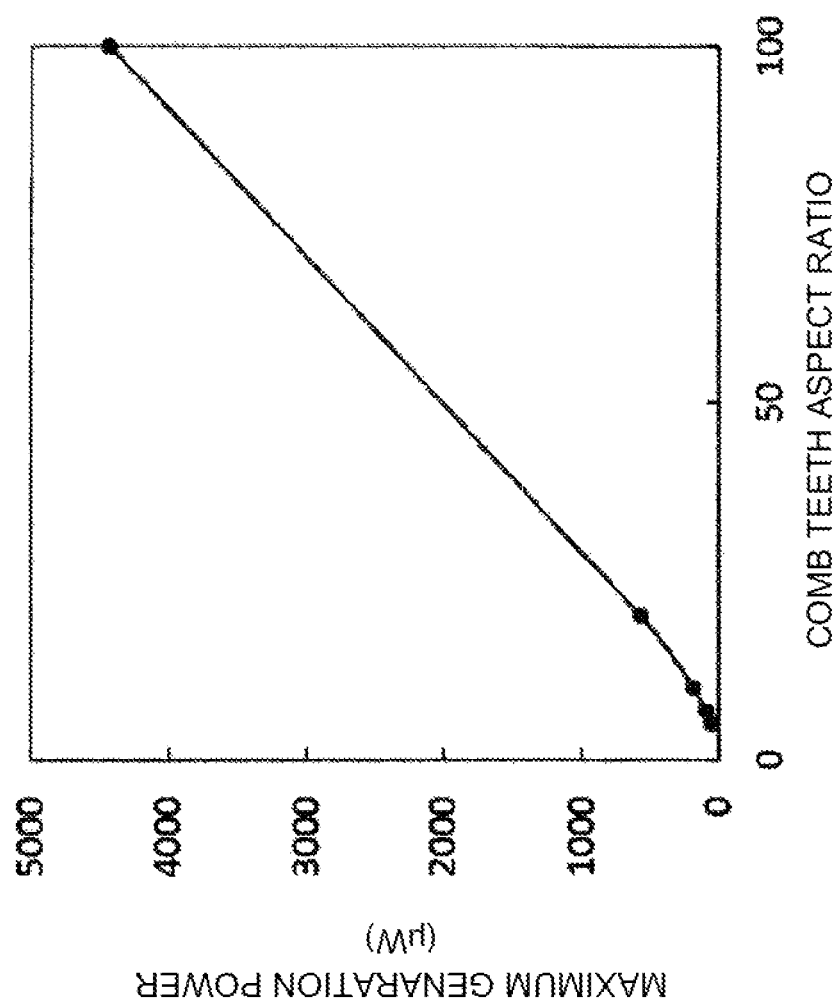
FIG. 14 is a graph showing an example of the relationship between the comb tooth aspect ratio at the time of maximum displacement and the generated power.

FIG. 14 is a graph showing an example of the relationship between the comb tooth aspect ratio and the generated power at the time of maximum displacement (optimal load connection). The maximum generated powers are shown when the comb tooth height L1 is fixed at 100 μm and the gap dimension G1 is set to 20 μm, 15 μm, 10 μm, 5 μm, and 1 µm. In each case, in the vibration-driven energy harvesting element 1, the number of comb teeth, the charging voltage, the maximum displacement of the movable electrode portion 121, and the like are set to be the same.

(1) As described above, the vibration-driven energy harvesting element 1 according to the present embodiment, comprises: a pair of the fixed electrode portions 111 that have a plurality of the fixed comb tooth electrodes 110 and are arranged such that the plurality of fixed comb tooth electrodes 110 face each other; and the movable electrode portion 121 that is arranged between the pair of fixed electrode portion 111 and has a pair of a plurality of movable comb tooth electrodes 120 being inserted between the plurality of fixed comb tooth electrodes 110 of each fixed electrode portion 111, wherein: the vibration-driven energy harvesting element 1 has a three-terminal structure in which the comb teeth 110 and/or the comb tooth electrodes 120 are electretized; the gap dimension G1 of the clearance region GA (gap region) between the comb tooth electrodes 110 and the comb tooth electrodes 120 is smaller than 20 µm; and the aspect ratio L1/G1, which is the ratio of the dimension L1 of the clearance region GA in the comb tooth height direction to the gap dimension G1 of the clearance region GA, is 20 or more.

In the case of a comb tooth structure that interdigitates with each other as shown in FIG. 5, the gap dimension is small and the aspect ratio is large in an interdigitating region, while the gap dimension is large and the aspect ratio is small in a non-interdigitating comb teeth root region. In such a case that a portion having a larger aspect ratio and a portion having a smaller aspect ratio are mixed, the comb tooth electrodes 110 and 120 having the gap dimension less than 20 µm and the aspect ratio of 20 or more can be easily formed by arranging the dummy patterns 406 shown in FIGS. 9 (a) and (c) at the openings between the comb tooth electrodes 110. As a result, it is possible to increase the generated power as compared with the conventional case while suppressing the increase in size of the vibration-driven energy harvesting element 1. It is to be noted, in addition to the gap dimension G1 and the aspect ratio of the gap region between the comb tooth electrode 110 and the comb tooth electrode 120, a difference between the aspect ratio of the gap region having the gap dimension G2 and the aspect ratio of the gap region having the gap dimension G1 may also be taken into account.

(2) In the above-described embodiment, a $SiO_2$ film containing negative charged (SiO−) ions as a permanent charge is formed and electretized on the surface of the comb tooth electrodes 110 of the fixed electrode portion 111. However, thermal oxide film (silicon oxide film) containing a permanent charge may be formed on a surface of at least either the comb tooth electrodes 110 or 120. Since this thermal oxide film is formed by thermally oxidizing the silicon which is a base material of the comb tooth electrodes 110 and 120, a uniform silicon oxide film can be formed on the entire surface of the comb tooth electrodes 110 and 120 even in a case where the aspect ratio is large.

(3) An electret protective film 500 is formed on the surface of the silicon oxide film ($SiO_2$ film) at which the electret is formed. By forming the electret protective film 500, the charge stability of the electret can be improved. As the electret protective film 500, for example, a protective film of aluminum oxide deposited by the Atomic Layer Deposition Method can be used. By using the ALD method, it is possible to achieve uniform film forming property even on the surface of a structure having a large aspect ratio such as the gap region of the comb tooth electrodes according to the present embodiment. Therefore, even for the comb tooth electrodes 110 and 120 having a large aspect ratio in the gap region, the protective film can be uniformly formed on the entire surface of the electret.

Although various embodiments and variations have been described above, the present invention is not limited to these contents. Other aspects that are conceivable within the scope of the technical idea of the present invention are also included within the scope of the present invention.

The disclosure of the following priority application is herein incorporated by reference: Japanese Patent Application No. 2018-215630 filed Nov. 16, 2018.

REFERENCE SIGNS LIST

1 . . . Vibration-driven Energy Harvesting Element, 11 . . . Fixed Portion,
12 . . . Movable Portion, 13 . . . Elastic Support Portion,
110, 120 . . . Comb tooth Electrode, 111 . . . Fixed Electrode Portion,
121 . . . Movable Electrode Portion, G1, G2 . . . Gap Dimension,
GA . . . Clearance Region (Gap Region).

The invention claimed is:

1. A vibration-driven energy harvesting element, comprising:
a pair of fixed electrode portions; and
a movable electrode portion that is arranged between the pair of fixed electrode portions and has a pair of a plurality of movable comb teeth extending from opposite sides of the movable electrode portion,
wherein:
each of the pair of fixed electrode portions has a plurality of fixed comb teeth facing a respective one of the opposite sides of the movable electrode portion,
the plurality of moveable comb teeth on the opposite sides of the movable electrode portion being inserted between the plurality of fixed comb teeth of the respective fixed electrode portions,
the vibration-driven energy harvesting element has a three-terminal structure in which the fixed comb teeth and/or the movable comb teeth are electretized,
the movable electrode portion is configured to move laterally in a plane containing the fixed comb teeth such that an overlap of the plurality of movable comb teeth with the plurality of fixed comb teeth in the plane alternately increases and decreases when the movable comb teeth move laterally between the pair of fixed electrodes,
a gap dimension of a clearance region between the fixed comb teeth and the movable comb teeth is smaller than 20 µm,
an aspect ratio, which is a ratio of a dimension of the clearance region in a comb tooth height direction between the fixed comb teeth and the movable comb teeth to the gap dimension of the clearance region between the fixed comb teeth and the movable comb teeth, is 20 or more,
in the fixed comb teeth that face each other, vertical surfaces of the fixed comb teeth are straight in the comb tooth height direction from a top to a bottom of the fixed comb teeth, and
the dimension of the clearance region in the comb tooth height direction is larger than 100 µm.

2. The vibration-driven energy harvesting element according to claim 1, wherein:
   the fixed comb teeth and the movable comb teeth are formed of silicon; and
   a silicon oxide film containing a permanent charge is formed at a surface of at least either the fixed comb teeth or the movable comb teeth.

3. The vibration-driven energy harvesting element according to claim 2, wherein:
   an electret protective film is formed on a surface of the silicon oxide film.

* * * * *